April 13, 1943.  A. RÜTTENAUER ET AL  2,316,366
FLUORESCENT MATERIAL
Filed Jan. 21, 1941
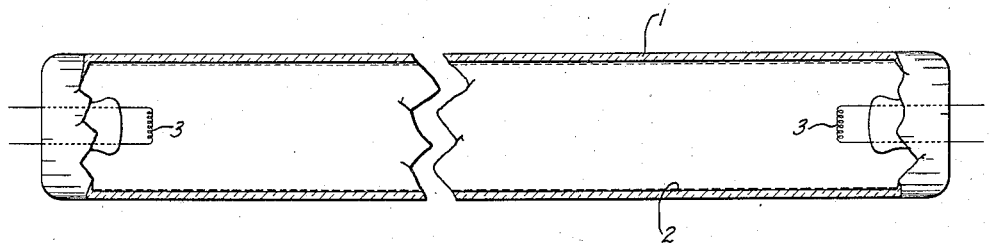
Inventors:
Alfred Rüttenauer,
Otto Fritze,
by John H. Anderson
Their Attorney.

Patented Apr. 13, 1943

2,316,366

UNITED STATES PATENT OFFICE 2,316,366

FLUORESCENT MATERIAL

Alfred Rüttenauer and Otto Fritze, Berlin-Wilmersdorf, Germany, assignors to General Electric Company, a corporation of New York Application January 21, 1941, Serial No. 375,354
In Germany February 14, 1940

4 Claims. (Cl. 176—122)

Our invention relates to lamps of the type wherein exciting radiation from a suitable source, preferably a low pressure mercury arc, impinges upon a layer of fluorescent material coated upon a wall of the lamp. More particularly it relates to a new fluorescent material therefor.

One of the materials hitherto employed for the layer of fluorescent substance in such lamps is borate of cadmium activated by the addition of a small amount of manganese. This material has a high light yield in the red region and its emission extends far into the long wave portion of the visible spectrum. However, it has the disadvantage that during the life of the tube its fluorescence is considerably reduced by the action of the exciting radiation. Even after the most careful production of the borate of cadmium through exact adherence to the firing temperature and uniformity of grain size, the loss of light after 1000 or 2000 hours of operation is usually from 25 to 30 per cent of the initial brightness.

We have now found that this condition can be considerably ameliorated if from 0.01 to 1 per cent of zinc, magnesium or calcium is added to the manganese-activated cadmium borate which may contain, for example, from 0.1 to 1 per cent of manganese. Zinc has been found to be particularly effective. As is customary in the making of fluorescent materials, these metals are added in the form of suitable compounds, preferably as oxides, which are converted into borates during the firing or glowing process. The addition of these metals results in a reduction of about 30 per cent or more in the light losses which unavoidably occur in the course of time where borate of cadmium is used in low-pressure mercury lamps.

Not only is the fluorescent layer of cadmium borate improved in respect to its lumen maintenance by the addition of the said metals in accordance with our invention, but also in regard to its stability at varying temperatures. Whereas, for instance, the borate of cadmium without the said metal additions has at 150° C. not more than 35 per cent of its brightness at room temperature, it retains almost 80% of its initial brightness at this temperature when 0.1 per cent of zinc is added. At 200° C. the corresponding values are 5 and 35 per cent respectively.

If it is desired to produce a white mixed light, the cadmium borate of our invention may be mixed in the usual manner after the firing process and, hence, after is production, with a fluorescent substance having a blue-green or blue luminescence. For example, if one wishes to provide a low-pressure mercury tube which furnishes white light, a mixture having from 55-65 per cent of the cadmium borate of our invention and from 45-35 per cent of magnesium tungstate, zinc tungstate or calcium tungstate may be used. The last mentioned materials are to be produced separately and must only be added to the borate of cadmium after the firing process.

The single figure of the drawing will serve to illustrate a lamp coated in accordance with the process of our present invention. The numeral 1 represents a vitreous envelope, preferably of glass, coated on its inside with a coating 2 of fluorescent material of the proportions prescribed above. The lamp may be of the type commonly used in the art of fluorescent lighting. For example, it may be of the type described in the United States Patent No. 2,182,732 to Meyer et al., and may contain activated cathodes 3—3 and, in addition to the usual filling of an ignition gas, a small amount of mercury or other vapor at pressures of the order of 1 to 20 microns. The ignition gas is preferably one of the rare gases commonly used and may have a pressure of the order of from several microns to several centimeters.

In preparing the cadmium borate, by way of example, 78.7 grams of cadmium oxide (CdO) are mixed with 21.3 grams of boron trioxide ($B_2O_3$). To this mixture are added 0.5 gram of manganese dioxide ($MnO_2$) and 0.12 gram of zinc oxide (ZnO), all of highest purity. The powder is heated at 830° C. for half an hour in a silica boat. After cooling the material, it may be ground, washed 4 times with distilled water and, after drying, passed through a 300-mesh sieve.

What we claim as new and desire to secure by Letters Patent of the United States is:

1. A fluorescent substance comprising heat treated borate of cadmium activated with manganese and containing in chemical combination therewith from 0.01 to 1 per cent of a metal taken from the group consisting of zinc, magnesium and calcium.

2. A fluorescent substance comprising heat treated borate of cadmium activated with from 0.1 to 1 per cent of manganese and containing in chemical combination therewith from 0.01 to 1 per cent of a metal taken from the group consisting of zinc, magnesium and calcium.

3. In combination, a mercury vapor electric discharge lamp containing an internal coating of a heat treated fluorescent borate of cadmium containing in chemical combination therewith from 0.01 to 1 per cent of a metal taken from the group consisting of zinc, magnesium and calcium, the said borate having substantially greater lumen maintenance and stability under the mercury vapor radiations than a similar borate devoid of said metal.

4. In combination, a mercury vapor electric discharge lamp containing an internal coating of a heat treated fluorescent borate of cadmium activated by from 0.1 to 1 per cent of manganese and containing in chemical combination therewith from 0.01 to 1 per cent of a metal taken from the group consisting of zinc, magnesium and calcium, the said borate having substantially greater lumen maintenance and stability under the mercury vapor radiations than a similar borate devoid of said metal.

ALFRED RÜTTENAUER.
OTTO FRITZE.